(12) United States Patent
Colvin et al.

(10) Patent No.: US 7,896,114 B2
(45) Date of Patent: Mar. 1, 2011

(54) METHOD FOR CONTROLLING ENGINE START IN A VEHICLE

(75) Inventors: Dan Colvin, Farmington Hills, MI (US); Brandon Masterson, Whitmore Lake, MI (US); Marvin Kraska, Dearborn, MI (US); Andrew Silveri, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/056,910

(22) Filed: Mar. 27, 2008

(65) Prior Publication Data

US 2008/0182722 A1    Jul. 31, 2008

Related U.S. Application Data

(63) Continuation of application No. 10/905,320, filed on Dec. 28, 2004, now Pat. No. 7,370,715.

(51) Int. Cl.
*B60K 6/387* (2007.10)
*B60W 20/00* (2006.01)

(52) U.S. Cl. .................. 180/65.28; 180/65.285; 903/930; 903/946

(58) Field of Classification Search .................. 180/65.2, 180/65.3, 65.4; 477/3, 5; 903/930, 941, 903/942, 946; 701/48
See application file for complete search history.

(56) References Cited

U.S. PATENT DOCUMENTS

| 4,335,429 A | 6/1982 | Kawakatsu |
|---|---|---|
| 5,343,970 A | 9/1994 | Severinsky |
| 5,681,242 A | 10/1997 | Bates |
| 5,916,061 A | 6/1999 | Koyama et al. |
| 6,018,198 A | 1/2000 | Tsuzuki et al. |
| 6,077,186 A | 6/2000 | Kojima et al. |
| 6,176,807 B1 | 1/2001 | Oba et al. |
| 6,176,808 B1 | 1/2001 | Brown et al. |
| 6,253,127 B1 | 6/2001 | Itoyama et al. |
| 6,364,807 B1 | 4/2002 | Koneda et al. |
| 6,524,219 B2 | 2/2003 | Mesiti et al. |
| 6,581,705 B2 | 6/2003 | Phillips et al. |
| 6,585,066 B1 | 7/2003 | Koneda et al. |

(Continued)

FOREIGN PATENT DOCUMENTS

GB    2413998 A    11/2005

(Continued)

OTHER PUBLICATIONS

Dan Colvin & Brandon Masterson, Challenges of Engine Starts and Drivability in a Parallel Hybrid-Electric System, SAE Technical Paper Series 2004-01-0063; dated Mar. 8-11, 2004 (12 pages).

(Continued)

*Primary Examiner* — Frank B Vanaman
(74) *Attorney, Agent, or Firm* — David B. Kelley; Brooks Kushman P.C.

(57) ABSTRACT

A vehicle includes a motor/generator, a disconnect clutch disposed between the engine and the motor/generator, and a transmission disposed between the motor/generator and the vehicle drive wheels. The transmission includes an input clutch which is selectively engagable for facilitating torque transfer between the motor/generator and the vehicle drive wheels. When an engine start is requested, the motor/generator is operated, and a start mode for the engine is determined based on a number of vehicle parameters. The transmission input clutch is partially disengaged to at least partially isolate the vehicle drive wheels from engine torque disturbances when the engine is started. The disconnect clutch is engaged, and the engine is fueled, thereby facilitating torque production by the engine.

18 Claims, 6 Drawing Sheets

U.S. PATENT DOCUMENTS

| | | | |
|---|---|---|---|
| 6,602,164 B2* | 8/2003 | Yoshiaki et al. | 477/107 |
| 6,655,485 B1* | 12/2003 | Ito et al. | 180/65.6 |
| 6,722,230 B2 | 4/2004 | Sakamoto et al. | |
| 6,823,954 B2* | 11/2004 | Shimabukuro et al. | 180/65.2 |
| 6,962,224 B2* | 11/2005 | Nakanowatari | 180/65.2 |
| 7,351,182 B2 | 4/2008 | Kobayashi | |
| 7,370,715 B2 | 5/2008 | Colvin | |
| 2001/0005805 A1 | 6/2001 | Saotome et al. | |
| 2002/0063002 A1 | 5/2002 | Lasson | |
| 2002/0179047 A1 | 12/2002 | Hoang et al. | |
| 2005/0121239 A1* | 6/2005 | Tsuneyoshi et al. | 180/65.2 |
| 2007/0102211 A1 | 5/2007 | Nozaki et al. | |
| 2007/0259755 A1 | 11/2007 | Tanishima | |
| 2008/0119975 A1 | 5/2008 | Yamazaki et al. | |
| 2009/0171538 A1 | 7/2009 | Kadota | |

FOREIGN PATENT DOCUMENTS

| | | |
|---|---|---|
| JP | 2000255285 A | 9/2000 |
| JP | 200554858 A | 3/2005 |
| WO | 03086804 A1 | 10/2003 |
| WO | 2007102776 A1 | 9/2007 |

OTHER PUBLICATIONS http://www.Volkswagenag.com/vwag/vwcorp/info_center/en/news/2007/09/more_drivability_fewer_emissions.html, pp. 1-6.

* cited by examiner

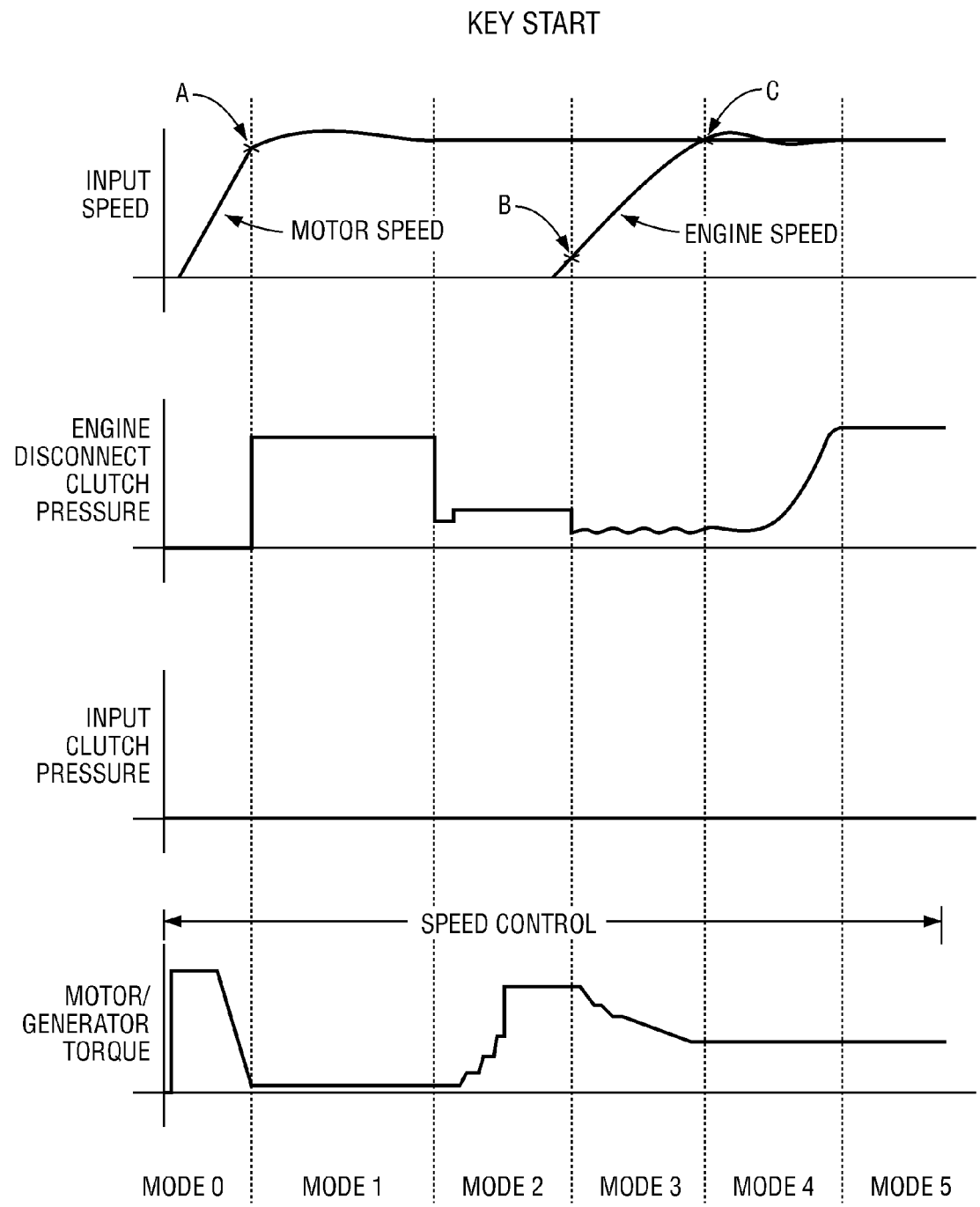

US 7,896,114 B2

METHOD FOR CONTROLLING ENGINE START IN A VEHICLE

CROSS REFERENCE TO RELATED APPLICATIONS

This application is a continuation of U.S. patent application Ser. No. 10/905,320 filed on 28 Dec. 2004, now U.S. Pat. No. 7,370,715, which is hereby incorporated herein by reference.

BACKGROUND OF THE INVENTION

1. Field of the Invention

The present invention relates to a vehicle and a method for controlling engine start in a vehicle.

2. Background Art

Hybrid electric vehicles (HEV's) utilize a combination of an internal combustion engine with an electric motor to provide the power needed to propel a vehicle. This arrangement provides improved fuel economy over a vehicle that has only an internal combustion engine. One method of improving the fuel economy in an HEV is to shutdown the engine during times that the engine operates inefficiently, and is not otherwise needed to propel the vehicle. In these situations, the electric motor is used to provide all of the power needed to propel the vehicle. When the driver power demand increases such that the electric motor can no longer provide enough power to meet the demand, or if the battery state of charge (SOC) drops below a certain level, the engine must start quickly and smoothly in a manner that is nearly transparent to the driver.

One method of controlling an HEV powertrain is described in U.S. Pat. No. 6,176,808 issued to Brown et al. on Jan. 23, 2001, and incorporated herein by reference. Brown et al. describes an HEV powertrain that includes a clutch disposed between an engine and a motor, which is operable to disconnect the engine from the motor. The powertrain described in Brown et al. also includes a transmission located on an output side of the motor. The transmission includes a number of gears and clutches which allow the transmission to be operated at different speed ratios. A control method described by Brown et al. includes controlling the slip of reverse and forward clutches within the transmission during engine idle and vehicle launch. Brown et al. notes that during vehicle launch, the engine can be shutdown and the entire launch powered by the electric motor. In this situation, the forward clutch in the transmission is fully locked, and is not allowed to slip. Alternatively, Brown et al. notes that the engine can be kept running and the forward clutch in the transmission allowed to slip, thereby allowing the motor to assist the launch and provide optimum launch performance.

Starting an engine in an HEV can occur when the vehicle is operating under any one of a number of different conditions. Control of the engine start may be different for different sets of conditions under which the vehicle is operating. In addition, starting the engine in an HEV when it is moving under the power of the electric motor, may cause a noticeable, and therefore undesirable, torque disturbance in the vehicle driveline. Therefore, a need exists for a vehicle, and a method for controlling engine start in a vehicle, that reduces or eliminates driveline torque disturbances when the engine is started.

SUMMARY OF THE INVENTION

One advantage of the present invention is that it provides a vehicle having an engine and an electric machine, wherein starting the engine can be controlled to reduce or eliminate driveline torque disturbances.

Another advantage of the present invention is that it provides a method for controlling engine start in a vehicle that reduces or eliminates driveline torque disturbances even when the vehicle is being propelled by the electric machine.

The invention also provides a method for starting an engine in a vehicle having an electric machine, a first clutch disposed between the engine and the electric machine for selectively connecting the engine to the electric machine, and a second clutch disposed between the electric machine and vehicle drive wheels. The second clutch is selectively engagable for facilitating torque transfer between the electric machine and the vehicle drive wheels. The method includes requesting an engine start, and operating the electric machine. The second clutch is partially disengaged if the second clutch is fully engaged when the engine start is requested. The partial disengagement of the second clutch causes the second clutch to slip, thereby at least partially isolating the vehicle drive wheels from engine torque disturbances. The method also includes engaging the first clutch, thereby connecting the engine to the electric machine, and fueling the engine, thereby facilitating torque production by the engine.

The invention further provides a method for starting an engine in a vehicle having a transmission, an accelerator, an electric machine, a first clutch disposed between the engine and the electric machine for selectively connecting the engine to the electric machine, and a second clutch disposed between the electric machine and vehicle drive wheels. The second clutch is selectively engagable for facilitating torque transfer between the electric machine and the vehicle drive wheels. The method includes requesting an engine start, operating the electric machine, and determining a start mode for the engine. Determining the start mode for the engine is based at least in part on at least one of a position of the accelerator and a current transmission gear. A first engine start mode includes the transmission gear being first gear or higher, and the accelerator position being at least partially open. The method further includes facilitating slip in the second clutch when it is determined that the engine is in the first start mode when the engine start is requested. The facilitating of slip in the second clutch at least partially isolates the vehicle drive wheels from engine torque disturbances. The first clutch is engaged, thereby connecting the engine to the electric machine, and the engine is fueled, thereby facilitating torque production by the engine.

The invention also provides a vehicle including drive wheels, an engine, a transmission, an electric machine operable to propel the vehicle and to rotate the engine, and a first clutch disposed between the engine and the electric machine for selectively connecting the engine to the electric machine. A second clutch is disposed between the electric machine and the vehicle drive wheels. The second clutch is selectively engagable for facilitating torque transfer between the electric machine and the vehicle drive wheels. The vehicle also includes a control system including at least one controller. The control system is configured to request an engine start, operate the electric machine, and facilitate slip in the second clutch if the transmission is in first gear or higher when the engine start is requested. The facilitating of slip in the second clutch at least partially isolates the vehicle drive wheels from engine torque disturbances. The control system is further configured to engage the first clutch, thereby connecting the engine to the electric machine, and to fuel the engine, thereby facilitating torque production by the electric machine.

BRIEF DESCRIPTION OF THE DRAWINGS

FIG. 7 is a graph illustrating how various parameters of the vehicle shown in FIG. 1 change over time during a key start.

DETAILED DESCRIPTION OF THE PREFERRED EMBODIMENT(S)

Figure 1:
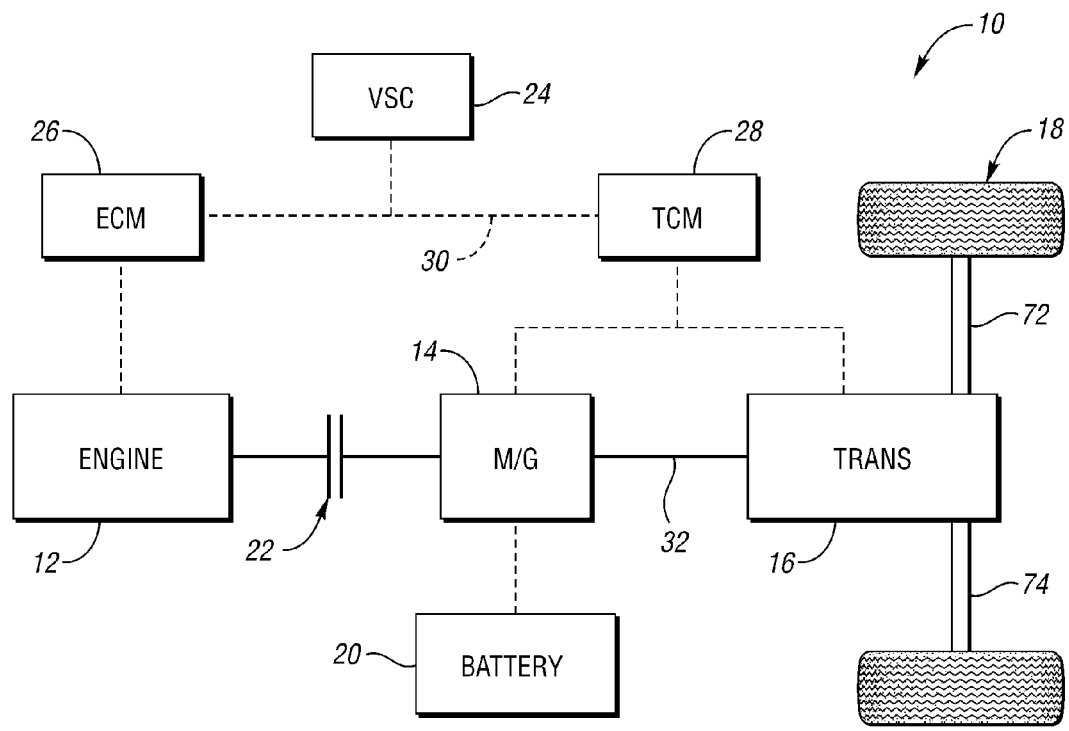
FIG. 1 is a schematic diagram of a vehicle in accordance with the present invention.

FIG. 1 shows a schematic diagram of a vehicle 10 in accordance with the present invention. The vehicle 10 is an HEV, and includes an engine 12, an electric machine, or motor/generator (M/G) 14, and a transmission 16 disposed between the M/G 14 and vehicle drive wheels 18. The M/G 14 can operate as a motor to provide torque to the vehicle wheels 18, and can also operate as a generator, receiving torque from the engine 12 and/or vehicle wheels 18, thereby charging a battery 20. The M/G 14 can also be operated to rotate the engine 12 when a first clutch, or disconnect clutch 22 is at least partially engaged.

The vehicle 10 also includes a control system, shown in the embodiment of FIG. 1 as three separate controllers: a vehicle system controller (VSC) 24, an engine control module (ECM) 26, and a transaxle control module (TCM) 28. As shown in FIG. 1, the ECM 26 is directly connected to the engine 12, while the TCM 28 is connected to the M/G 14 and the transmission 16. The three controllers 24, 26, 28 are connected to each other via a controller area network (CAN) 30. Although the control system of the vehicle 10 is embodied in FIG. 1 in three separate controllers, such a control system could be embodied in more or less than three controllers, as desired.

Figure 2:
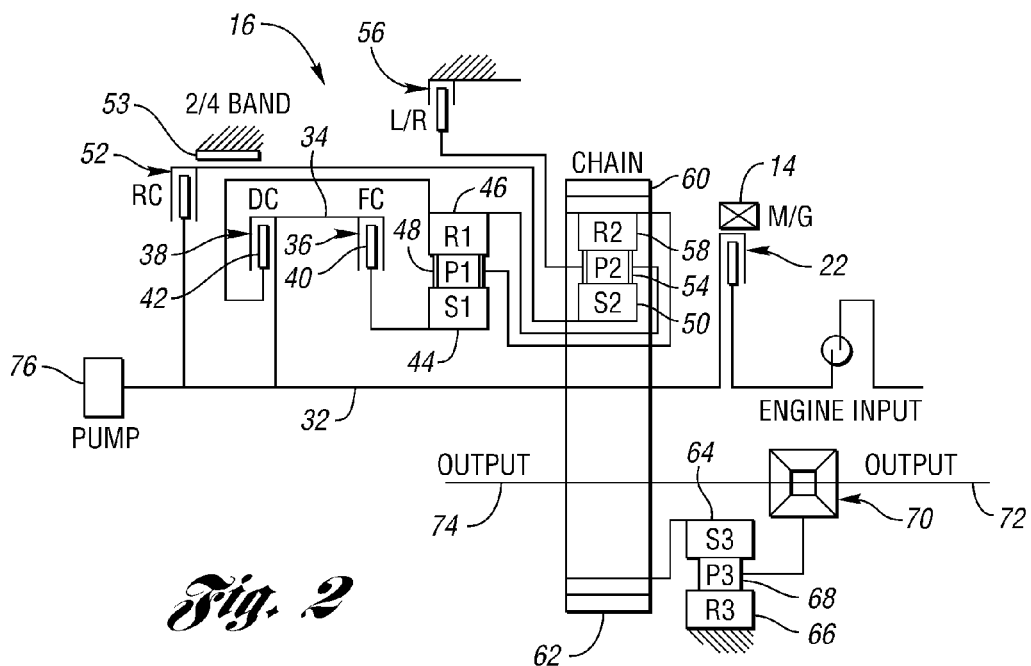
FIG. 2 is a schematic diagram showing some of the elements shown in FIG. 1, including details of a transmission.

FIG. 2 shows the transmission 16 in detail, along with some of the other vehicle components. The transmission 16 includes an input shaft 32 that receives torque from the M/G 14, the engine 12, or the M/G 14 and the engine 12. The transmission input shaft 32 is operatively connected to a first portion 34 of a second clutch, or forward clutch (FC) 36. The first portion 34 of the forward clutch 36 is also the first portion of a direct clutch (DC) 38. The forward clutch 36 and the direct clutch 38 each have respective second portions 40, 42 which are operatively connected to a respective torque element within the transmission 16.

The second portion 40 of the forward clutch 36 is operatively connected to a first sun gear (S1) 44 while the second portion 42 of the direct clutch 38 is operatively connected to a first ring gear (R1) 46. As shown in FIG. 2, the first planetary gear set, which includes the ring gear 46, the sun gear 44, and planetary carrier (P1) 48, is operatively connected to a second planetary gear set. The second planetary gear set includes a second sun gear (S2) 50, which is connected to a reverse clutch (RC) 52. As shown in FIG. 2, the reverse clutch 52, which includes a friction brake 53, is also operatively connected to the transmission input shaft 32.

The second planetary gear set also includes a planet carrier (P2) 54 which is connected on one side to the ring gear 46, and on the other side to a low-and-reverse brake (L/R) 56. A ring gear 58 defines a sprocket for a chain drive, indicated generally at 60. The chain drive 60 drives a sprocket 62, which in turn, drives a sun gear (S3) 64 of a third planetary gear set. A ring gear (R3) 66 is grounded to a housing of the transmission 16, while planetary carrier (P3) 68 is attached to differential gearing 70. The differential gearing 70 is operable to transfer driving torque to each of two axle half shafts 72, 74. A detailed cross sectional view of one embodiment of a transmission, such as the transmission 16, is shown in U.S. Pat. No. 6,585,066 issued to Koneda et al. on Jul. 1, 2003, which is hereby incorporated herein by reference. Also shown in FIG. 2 is a pump 76 which is operable to provide pressure to the transmission clutches.

Figure 3:
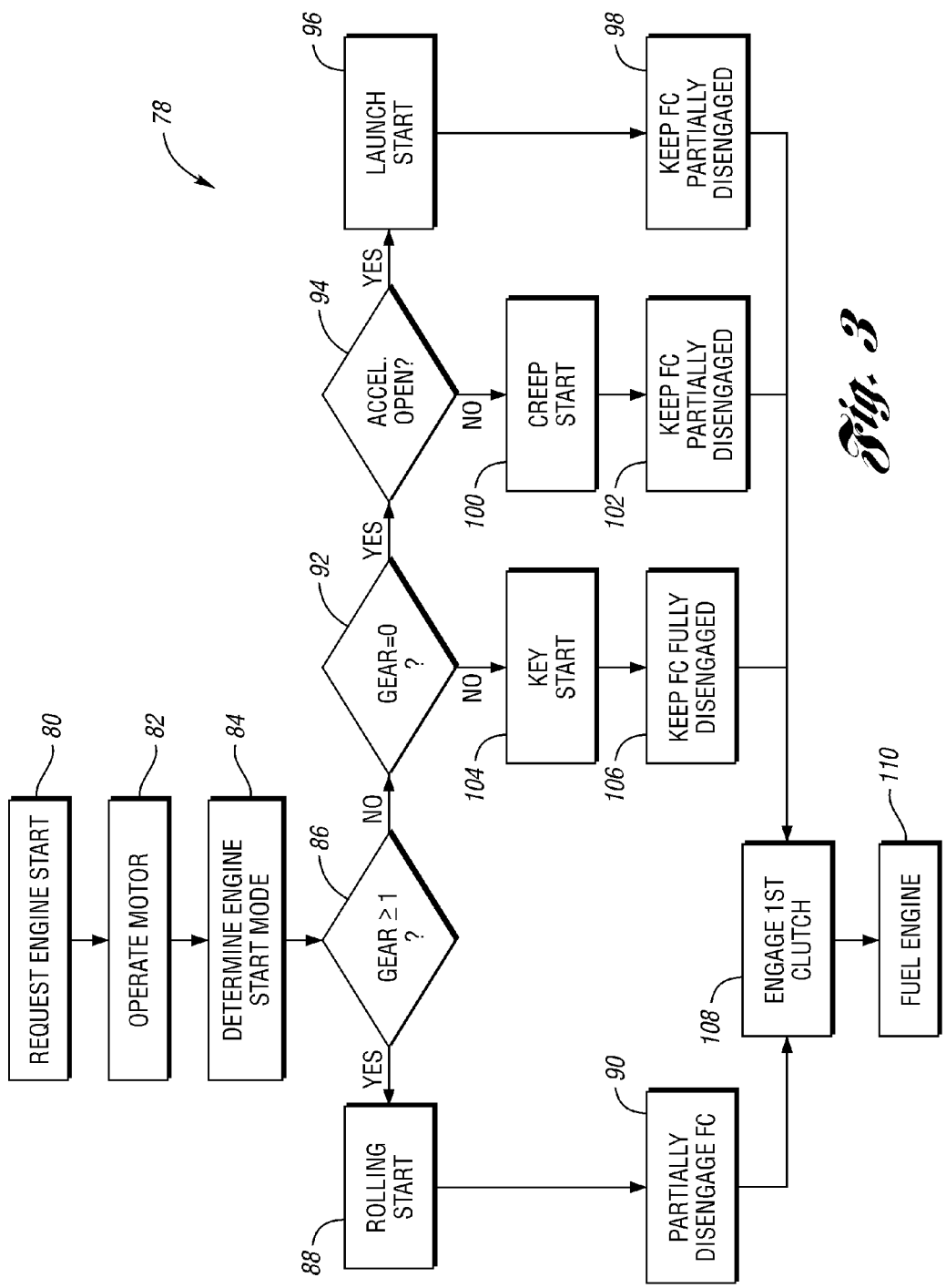
FIG. 3 is a flowchart illustrating a method in accordance with the present invention.

FIG. 3 shows a high level flowchart 78 illustrating a method in accordance with the present invention. As discussed above, the present invention provides a method for starting an engine, such as the engine 12 in the vehicle 10. Throughout the description of the flowchart 78, the components of the vehicle 10, shown in FIGS. 1 and 2, will be used for reference. At step 80, an engine start is requested. This request can be initiated by the VSC 24, based on a number of input signals. For example, driver determined parameters, such as brake pedal position and accelerator position may be used by the VSC 24 to calculate an overall driver demand. In addition, the battery SOC, as well as information from the transaxle, provided by the TCM 28, can be used to determine when an engine start is needed. When an engine start is needed, the VSC 24 will "request" the engine start by coordinating operation of various vehicle components, such that the engine 12 will be started with little or no driveline torque disturbance apparent to a vehicle occupant.

At step 82, the M/G 14 is operated, and as explained below, will be used to start the engine 12. The steps that will be performed to start the engine 12 are dependent on the state of the vehicle operation at the time the engine start is requested. Therefore, at step 84, a determination is made as to the engine start mode. In the embodiment shown in FIG. 3, there are four different engine start modes, each of which is described below in detail. It is worth noting that more than four, or less than four, engine start modes are contemplated by the present invention; however, using the four engine start modes illustrated in FIG. 3 provides an efficient and effective method of implementing the present invention.

One step in determining which engine start mode will be used, is to determine the current gear of the transmission 16. At decision block 86 it is determined whether the transmission 16 is in first gear or higher—this includes reverse. The transmission 16 is in a gear that is lower than first gear only if it is in "zero gear". In general, the term "zero gear" refers to the situation when the vehicle 10 is slowly moving forward in a creep mode, which is facilitated by the slipping of the forward clutch 36 and/or the low-and-reverse brake 56. It is worth noting, however, that one or more of the clutches 36,38, 52 and/or the low-and-reverse brake 56 may be slipping a small amount, even when the transmission is in first gear or higher.

For purposes of implementing the present invention, the TCM 28 will determine the current transmission gear. For example, if the transmission 16 shifts into first gear, the TCM 28 will consider it to remain in first gear until it shifts into another gear. First gear for the transmission 16 is characterized by the substantial engagement of the forward clutch 36 and the low-and-reverse brake 56. Even if the forward clutch 36 and/or the low-and-reverse brake 56 are allowed to slip a small amount while the transmission 16 is in first gear, it will not be considered in zero gear. Only when the transmission 16 has shifted out of first gear into zero gear—which may be characterized by a marked increase in the amount of clutch slip—will the TCM 28 consider the transmission to be in zero gear.

If it is determined at decision block 86 that the transmission 16 is in first gear or higher, the engine 12 is in a first, or rolling, start mode—see block 88. In the rolling start mode, the forward clutch 36 may fully engaged, or as previously noted, it may already have a small amount of slip. When it is determined that the engine 12 is in a rolling start mode when the engine start is requested, slipping of the forward clutch 36 is facilitated. Thus, if the forward clutch 36 is already slipping a small amount, it can be further disengaged, if needed, to increase the slip. Conversely, if the forward clutch is fully engaged when the engine start is requested, facilitating slipping involves partially disengaging the forward clutch 36—see step 90. By partially disengaging the forward clutch 36, the vehicle driveline, including the vehicle wheels 18, is at least partially isolated from engine torque disturbances, so that starting the engine 12 may be imperceptible to a vehicle occupant.

If, at decision block 86, it is determined that the transmission 16 is not in first gear or higher, it is next determined whether it is in zero gear—see decision block 92. If the transmission 16 is in zero gear, it is next determined whether the accelerator is at least partially open—see decision block 94. If, at decision block 94, it is determined that the accelerator is at least partially open, the engine 12 is in a launch start mode—see block 96. A launch start mode occurs when the accelerator is open, and the vehicle is at a near rest condition.

The primary difference between the launch start mode and the rolling start mode, is that in the launch start mode, the forward clutch 36 is already slipping significantly when the engine start request is received. Therefore, in contrast to step 90, where the forward clutch 36 was partially disengaged from its previously fully engaged position, at step 98, the forward clutch 36 is kept partially disengaged. As explained more fully below, the amount of slip that is allowed to occur when the forward clutch 36 is partially disengaged, can be controlled by controlling the pressure of the clutch 36 and the speed of the M/G 14.

Returning to decision block 94, if it is determined that the accelerator is not open, it is next determined whether the engine 12 is in a third, or creep, start mode—see block 100. A creep start mode occurs when a vehicle is in a drive idle state. Drive idle occurs when the vehicle is at rest with the accelerator pedal off—i.e., the accelerator is closed. In a conventional vehicle, the torque converter provides a small amount of torque into the transmission. Whenever the brake pedal is released, this driveline torque will cause the vehicle to roll slowly under flat road conditions. This low level of torque is known as creep.

In an HEV, the engine is normally shutdown during drive idle. When the brake pedal is released, the engine can be requested to start. Such a start is known as "creep start". In the creep start mode, as in the launch start mode, the forward clutch 36 is already partially disengaged, and is therefore already slipping. Thus, all that needs to be done to keep the vehicle drive wheels 18 at least partially isolated from engine torque disturbances, is to keep the forward clutch 36 partially disengaged—see step 102.

Finally, if it is determined at decision block 92 that the transmission 16 is not in zero gear—i.e., it is in park or neutral—then the engine 12 is in a fourth, or key, start mode—see block 104. A key start occurs when the vehicle operator turns the key in the vehicle to command the engine to start. This event replicates the start that is done in non-hybrid vehicles, where the starter motor is engaged to start the engine while the transmission is in either park or neutral. In the case of the vehicle 10, the M/G 14 is used to rotate the engine 12 and bring it up to speed. Because the vehicle 10 is in park or neutral during the key start mode, the forward clutch 36 is fully disengaged when the M/G 14 is operated.

It is worth noting that even though the method illustrated in FIG. 3 discusses keeping the forward clutch 36 less than fully engaged in order to isolate the vehicle drive wheels 18 from engine torque disturbances, the same is true for the other input clutches in the transmission 16—i.e., the direct clutch 38 and the reverse clutch 52. When an engine start is requested, and it is determined that the engine 12 is in the key start mode, the forward clutch 36 is kept fully disengaged—see block 106. Having the forward clutch 36, and the other input clutches 38, 52, fully disengaged, completely isolates the vehicle drive wheels 18 from any engine torque disturbances.

Regardless of which of the four engine start modes is used, the disconnect clutch 22 is engaged so that the M/G 14 begins to rotate the engine 12 to bring it up to speed—see block 108. Finally, at block 110, the engine 12 is fueled, and it begins to produce torque. Although the steps of the flowchart 78 described above in a particular order, in practice, these steps need not be performed in any particular sequence, and in fact, one or more of the steps may be performed concurrently.

Figure 4:
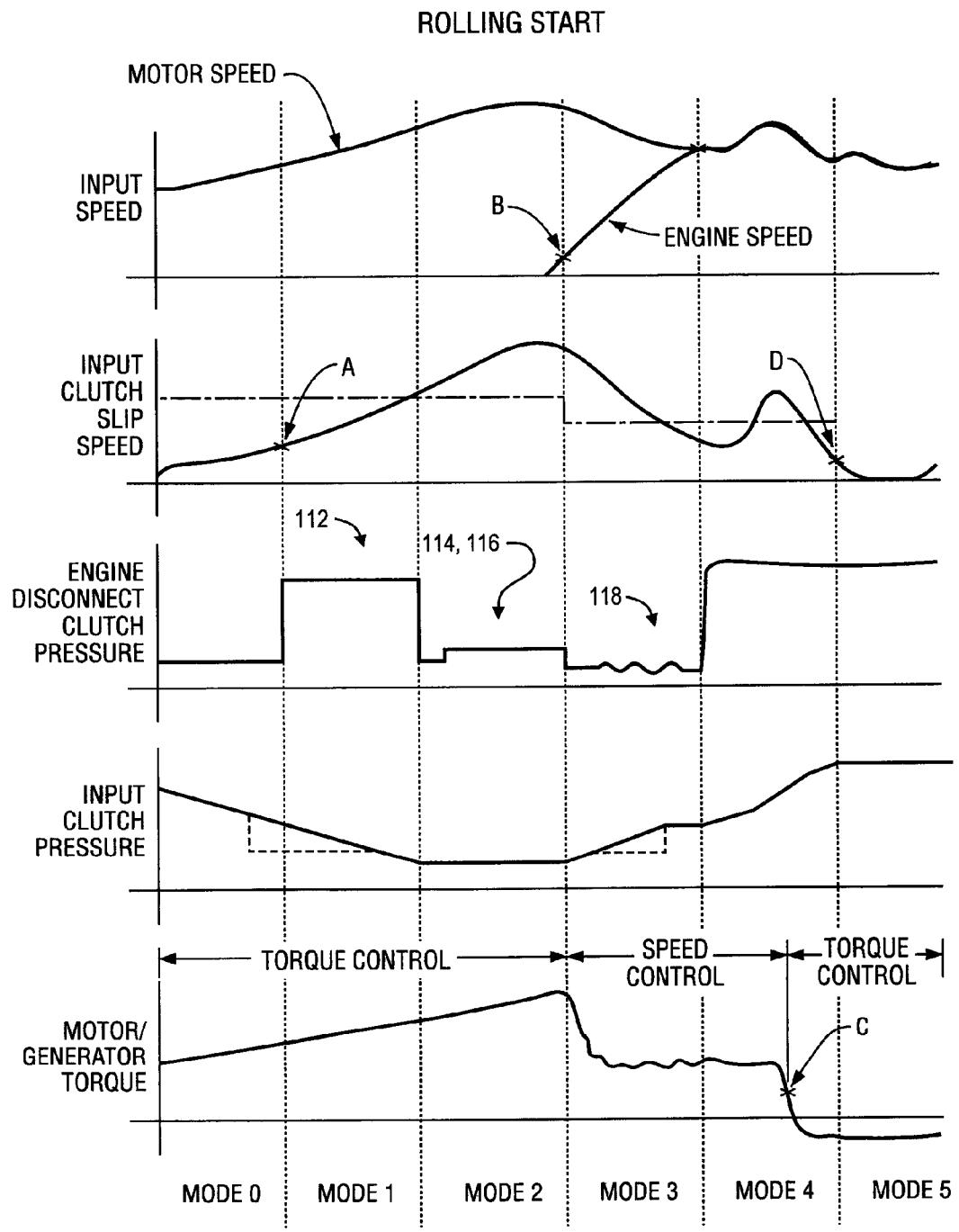
FIG. 4 is a graph illustrating how various parameters of the vehicle shown in FIG. 1 change over time during a rolling start.

Each of the four engine start modes are now described in detail using FIGS. 4-7. FIG. 4 shows a diagram of the rolling start mode as various vehicle parameters change over time. Each of the diagrams shown in FIGS. 4-7 are broken into six modes, modes 0-5. These modes provide a convenient way to mark events throughout the various types of engine starts. As shown in FIG. 4, the rolling start mode begins with the input clutch pressure—i.e., the pressure in the forward clutch 36—relatively high. This is because the forward clutch 36 is either fully engaged at the beginning of the rolling start mode, or it is slipping a very small amount. As shown in FIG. 4, the "Input Clutch Slip Speed" has some small positive value at the start of mode 0. This indicates that for the rolling start illustrated in FIG. 4, the forward clutch 36 is already slipping a small amount when the rolling start mode is entered.

During mode 0, the forward clutch 36 is partially disengaged to isolate the driveline from engine torque disturbances. This is indicated by the increase in input clutch slip speed. When the forward clutch 36 is partially disengaged, and the M/G 14 is operating, there will be a difference in the angular speed of the first and second portions 34, 40 of the forward clutch 36. This difference in speed is the slip speed of the forward clutch 36.

During mode 0, a target slip speed is set; this is shown by the horizontal dot-dash line. If the actual slip speed is lower than the target slip speed, the pressure command to the forward clutch 36 is ramped down. If the actual slip speed is higher than the target slip speed, the pressure of the forward clutch 36 is held constant. There is also a safety net used if the slip speed gets too high, in which case, the pressure command will be increased. By controlling the pressure of the forward clutch 36, and the speed of the M/G 14, the slip speed of the forward clutch 36 is increased until it is greater than a first predetermined slip speed. This is shown at the end of mode 0, at point A, in FIG. 4.

In mode 1, the disconnect clutch 22 begins to be applied. The pressure of the disconnect clutch 22 is raised stepwise to a first level for a predetermined time—in this case, the duration of mode 1, where it follows a first pressure profile 112. This operation is known as boosting, and is used to fill the clutch 22 as fast as possible. At the end of mode 1, the pressure in the disconnect clutch 22 is reduced to a second level, and before the end of mode 2, it is increased to an intermediate level between the first and second levels, where it follows a second pressure profile 114. The pressure in the disconnect clutch 22 changes over time according to a first function, which in the embodiment illustrated in FIG. 4 is a step function 116. This increase in the pressure of the disconnect clutch 22 during mode 2, helps to ensure that the M/G 14 provides enough torque through the clutch 22 to overcome the first compression stroke of the engine 12.

Also shown in FIG. 4, the M/G 14 is operated in torque control mode for the duration of modes 0-2. During torque control mode, the M/G 14 is allowed to operate at whatever speed is necessary for it to produce a desired amount of torque. Also shown in FIG. 4, the torque of the M/G 14 increases throughout modes 0-2. Near the end of mode 2, the speed of the engine 12 begins to increase. The end of mode 2, and the end of torque control for the M/G 14, occurs when the engine speed is greater than a first predetermined engine speed. This is shown at the end of mode 2, at point B, in FIG. 4.

In mode 3, the engine speed is brought up to the speed of the M/G 14, and the forward clutch 36 begins to lock. At the beginning of mode 3, the target slip speed—again indicated by the horizontal dot-dash line—for the forward clutch 36 is lowered, since some slip is still needed to provide driveline isolation, but inertia torque to assist the M/G 14 in turning the engine 12 is no longer needed. As shown in FIG. 4, starting in mode 3, the disconnect clutch 22 follows a third pressure profile 118.

Throughout mode 3, and part of mode 4, the M/G 14 is operated in speed control mode. In speed control mode, the M/G 14 is controlled to maintain a desired speed, and its output torque is allowed to fluctuate. As shown in FIG. 4, the torque of the M/G 14 generally decreases throughout modes 3 and 4, as the speed of the engine 12 increases. The M/G 14 is operated in the speed control mode until its output torque falls below a predetermined output torque. This is shown in FIG. 4 at point C. After the torque of the M/G 14 falls below the predetermined output torque, the M/G 14 is again operated in torque control mode. At this point, the torque command is ramped to a negative value to dampen the engine start transient and to begin charging the battery 20.

The end of mode 4 occurs when the slip speed of the forward clutch 36 drops below a second predetermined slip speed. This is shown at point D in FIG. 4. After mode 4, control of the M/G 14 is transitioned back to the VSC 24 and/or the TCM 28, and the engine start is finished. In mode 5, the forward clutch 36 is fully engaged, thereby eliminating slip in the forward clutch 36 and facilitating torque transfer from the engine 12 and the M/G 14 to the vehicle drive wheels 18.

Figure 5:
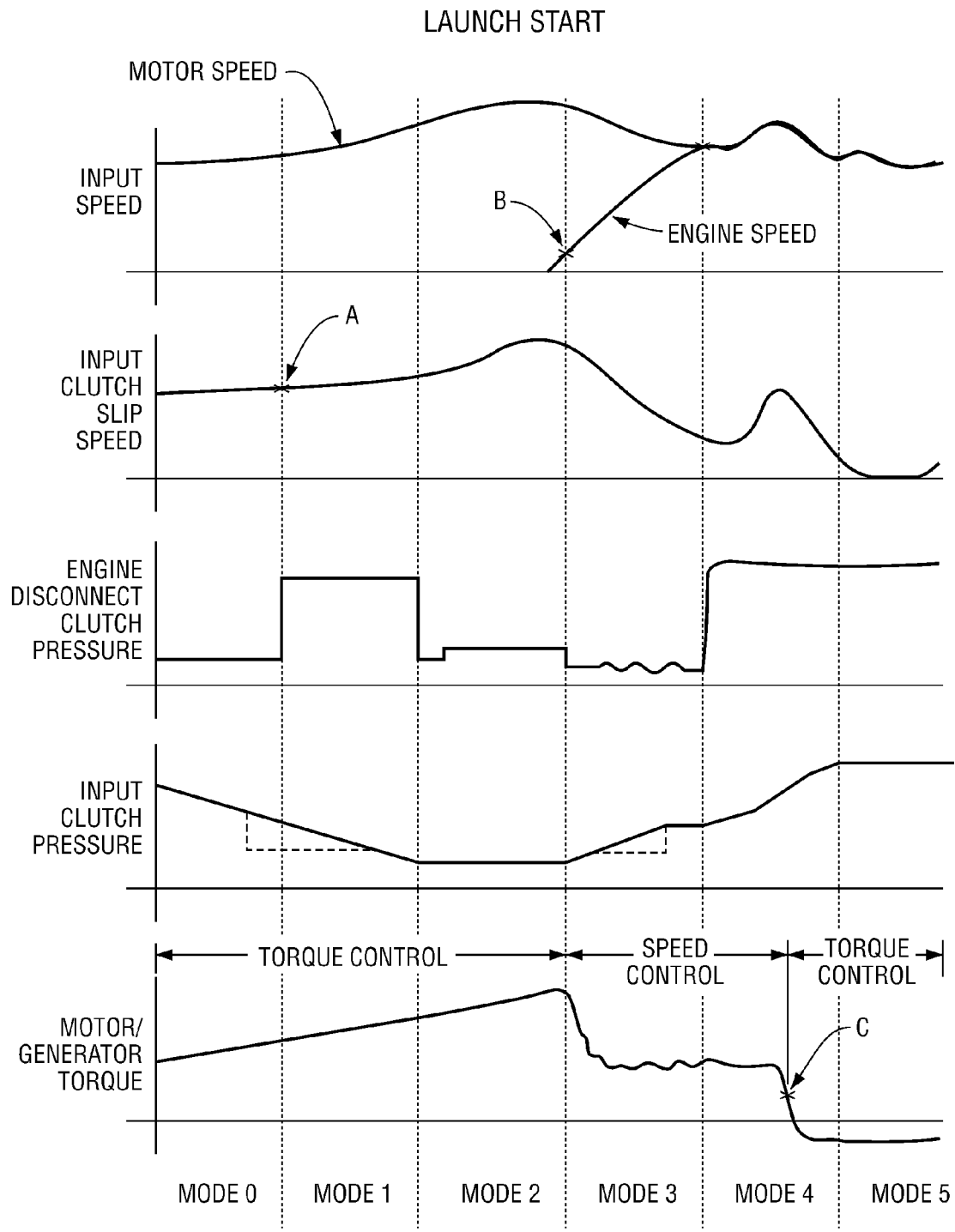
FIG. 5 is a graph illustrating how various parameters of the vehicle shown in FIG. 1 change over time during a launch start.

FIG. 5 shows the details of a launch start mode. As shown in FIG. 5, this start mode is similar to the rolling start mode illustrated in FIG. 4, with the primary difference being that the forward clutch 36 is already slipping significantly when mode 0 begins. Since the forward clutch 36 is already slipping, the slip speed may already be above the target slip speed, which means the transition to mode 1 may be almost instantaneous.

Figure 6:
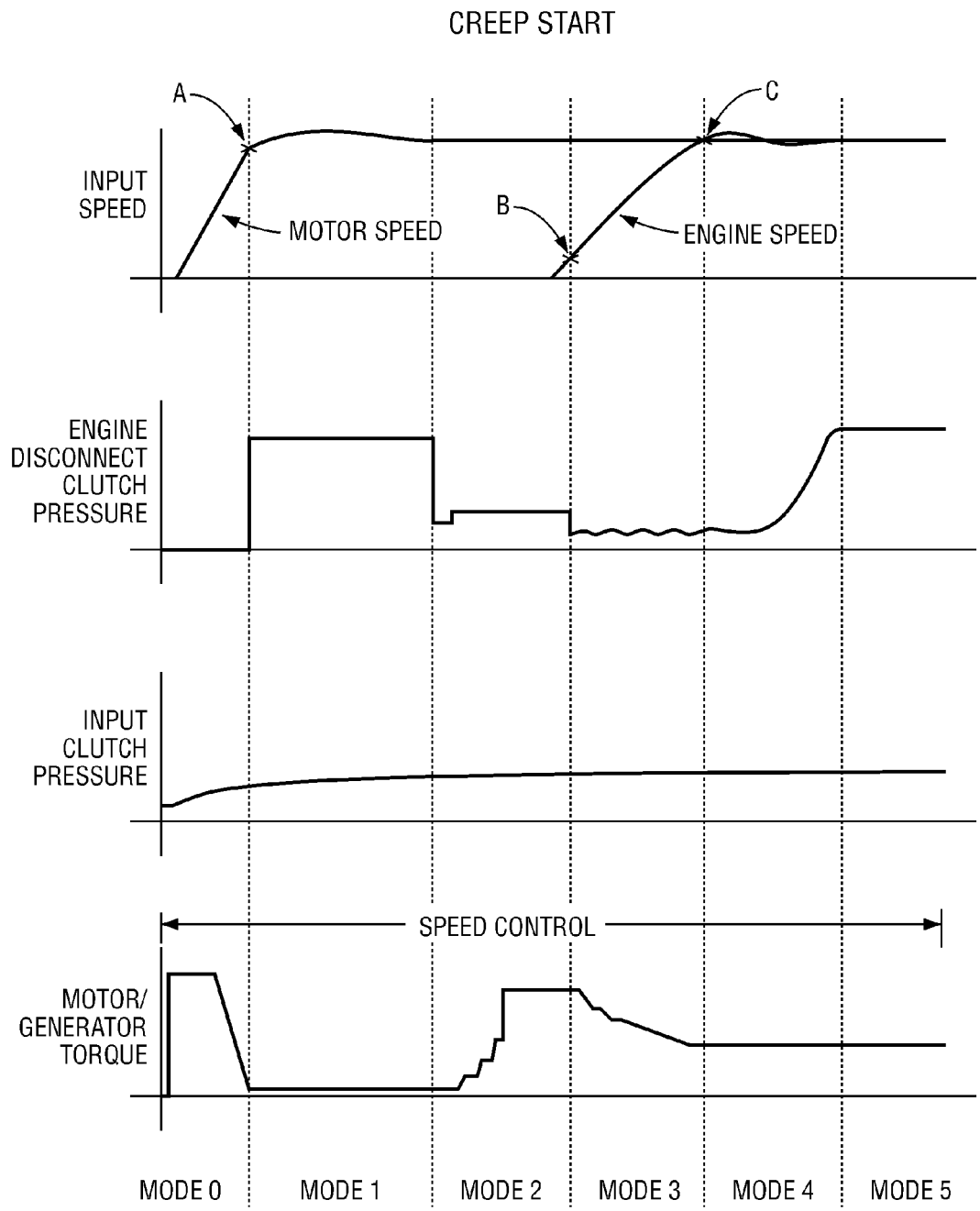
FIG. 6 is a graph illustrating how various parameters of the vehicle shown in FIG. 1 change over time during a creep start.

Similar to a launch start, the creep start mode begins with the forward clutch 36 already slipping; this is illustrated in FIG. 6. At the beginning of mode 0, the M/G 14 is not initially operating. During mode 0, the M/G 14 is operated in unidirectional speed control mode to increase its speed until a first predetermined speed is reached. This is shown at the end mode 0, at point A, in FIG. 6. In mode 1, the disconnect clutch 22 is commanded to fill. As shown in FIG. 6, the pressure profile for the disconnect clutch 22 is essentially the same for each of the different start modes, including the key start mode described below. Also similar to the other start modes, mode 2 for the creep start mode ends when the speed of the engine 12 is greater than a predetermined engine speed. This is shown at point B in FIG. 6. Unlike the launch start mode and the rolling start mode, however, the creep start mode continues to operate the M/G 14 in the speed control mode, rather than transitioning between torque control and speed control modes.

When the slip speed of the disconnect clutch 22 reaches a predetermined value, it indicates that the end of mode 3 is near. This is shown at point C in FIG. 6, where the engine speed essentially matches the speed of the M/G 14. In mode 4, the pressure of the clutch 22 is commanded to its maximum value through an open loop command that is calibrated to smoothly complete the lock-up of the clutch 22. Once the maximum pressure command is obtained, control of the clutch 22 is complete, and the mode changes to mode 5, which indicates the end of the start event.

FIG. 7 is a diagram illustrating the key start mode. As seen by a comparison between FIGS. 6 and 7, the key start mode very closely resembles the creep start mode in its implementation. One obvious difference is that none of the input clutches, including the forward clutch 36, are engaged during a key start. This is evidenced by the lack of input clutch pressure shown in FIG. 7. In this mode, the forward clutch 36 is fully disengaged. As in the creep start mode, the M/G 14 is operated in speed control mode throughout the duration of the key start mode, and the disconnect clutch 22 begins to be engaged when the speed of the M/G 14 reaches a first predetermined speed.

While the best mode for carrying out the invention has been described in detail, those familiar with the art to which this invention relates will recognize various alternative designs and embodiments for practicing the invention as defined by the following claims.

What is claimed:

1. A method for starting an engine in a vehicle having an electric machine, a first clutch disposed between the engine and the electric machine for selectively connecting the engine to the electric machine, and a second clutch disposed between the electric machine and vehicle drive wheels, the second clutch being selectively engagable for facilitating torque transfer between the electric machine and the vehicle drive wheels, the method comprising:
    requesting an engine start;
    operating the electric machine;
    facilitating slip in the second clutch, thereby at least partially isolating the vehicle drive wheels from engine torque disturbances;
    engaging the first clutch with a rapid fill to bring a pressure of the first clutch to a first level;
    reducing the pressure of the first clutch to a second level, the second level being defined by a first function;
    reducing the pressure of the first clutch to a third level;
    controlling the pressure of the first clutch in accordance with a pressure profile until there is at least substantially no slipping in the first clutch; and
    fueling the engine, thereby facilitating torque production by the engine.

2. The method of claim 1, further comprising fully engaging the second clutch after the engine is fueled, thereby eliminating slip in the second clutch and facilitating torque transfer from the engine and the electric machine to the vehicle drive wheels.

3. The method of claim 1, the vehicle including a transmission having the second clutch disposed therein, the second clutch including a first portion operatively connected to an input shaft of the transmission and a second portion operatively connected to a torque element in the transmission, wherein the second clutch slips at a slip speed defined as a difference between the angular speed of the first and second portions, and wherein engaging the first clutch begins when the slip speed is greater than a first predetermined slip speed.

4. The method of claim 1, wherein operating the electric machine includes:

operating the electric machine in a torque control mode until a speed of the engine is greater than a first predetermined engine speed, operating the electric machine in a speed control mode when the engine speed is greater than the first predetermined engine speed and output torque of the electric machine is not less than a predetermined output torque, the operating of the electric machine in the speed control mode effecting a reduction in the output torque of the electric machine when the engine begins to produce torque, and operating the electric machine in the torque control mode after the output torque of the electric machine is reduced by the engine beginning to produce torque.

5. The method of claim 1, the vehicle including a transmission operatively disposed between the electric machine and the vehicle drive wheels, the method further comprising:

keeping the second clutch fully disengaged if the second clutch is fully disengaged when the engine start is requested, and wherein operating the electric machine includes increasing the speed of the electric machine, and engaging the first clutch begins when the speed of the electric machine is greater than a first predetermined electric machine speed.

6. The method of claim 1, wherein facilitating slip in the second clutch includes at least one of partially disengaging the second clutch if the second clutch is fully engaged when the engine start is requested or keeping the second clutch partially disengaged if the second clutch is partially disengaged when the engine start is requested.

7. The method of claim 1, the vehicle further having a transmission and an accelerator, the method further comprising keeping the second clutch partially engaged when it is determined that a current transmission gear is below a first gear and a current position of the accelerator is partially open when the engine start is requested, the second clutch being kept partially engaged at least until after the engine is fueled.

8. The method of claim 1, the vehicle further having a transmission and an accelerator, the method further comprising keeping the second clutch partially engaged when it is determined that a current transmission gear is below a first gear and a current position of the accelerator is closed when the engine start is requested, the second clutch being kept partially engaged at least until after the engine is fueled.

9. The method of claim 1, the vehicle further having a transmission, the method further comprising keeping the second clutch fully disengaged when it is determined that a current transmission gear is one of park gear or neutral gear when the engine start is requested.

10. A method for starting an engine in a vehicle having an electric machine, a first clutch disposed between the engine and the electric machine for selectively connecting the engine to the electric machine, and a second clutch disposed between the electric machine and vehicle drive wheels, the second clutch being selectively engagable for facilitating torque transfer between the electric machine and the vehicle drive wheels, the method comprising:

requesting an engine start;

operating the electric machine;

facilitating slip in the second clutch, thereby at least partially isolating the vehicle drive wheels from engine torque disturbances;

engaging the first clutch with a rapid fill to bring a pressure of the first clutch to a first level;

controlling the pressure of the first clutch such that it follows a non-increasing first pressure profile after the pressure of the first clutch reaches the first level;

reducing the pressure of the first clutch from the first level and controlling the pressure such that it follows a second pressure profile;

controlling the pressure of the first clutch such that it follows a third pressure profile different from the second pressure profile;

controlling the first clutch pressure in accordance with the third pressure profile until there is at least substantially no slipping in the first clutch; and fueling the engine, thereby facilitating torque production by the engine, and wherein operating the electric machine includes:

operating the electric machine in a torque control mode until a speed of the engine is greater than a first predetermined engine speed, operating the electric machine in a speed control mode when the engine speed is greater than the first predetermined engine speed and output torque of the electric machine is not less than a predetermined output torque, the operating of the electric machine in the speed control mode effecting a reduction in the output torque of the electric machine when the engine begins to produce torque, and operating the electric machine in the torque control mode after the output torque of the electric machine is reduced by the engine beginning to produce torque.

11. The method of claim 10, the vehicle including a transmission having the second clutch disposed therein, the second clutch including a first portion operatively connected to an input shaft of the transmission and a second portion operatively connected to a torque element in the transmission, wherein the second clutch slips at a slip speed defined as a difference between the angular speed of the first and second portions, and wherein engaging the first clutch begins when the slip speed is greater than a first predetermined slip speed.

12. The method of claim 10, wherein facilitating slip in the second clutch includes at least one of partially disengaging the second clutch if the second clutch is fully engaged when the engine start is requested or keeping the second clutch partially disengaged if the second clutch is partially disengaged when the engine start is requested.

13. A method for starting an engine in a vehicle having an electric machine, a first clutch disposed between the engine and the electric machine for selectively connecting the engine to the electric machine, and a second clutch disposed between the electric machine and vehicle drive wheels, the second clutch being selectively engagable for facilitating torque transfer between the electric machine and the vehicle drive wheels, the method comprising:

requesting an engine start;

operating the electric machine in a torque control mode until a speed of the engine is greater than a first predetermined engine speed;

operating the electric machine in a speed control mode when the engine speed is greater than the first predetermined engine speed and output torque of the electric machine is not less than a predetermined output torque, the operating of the electric machine in the speed control mode effecting a reduction in the output torque of the electric machine when the engine begins to produce torque;

operating the electric machine in the torque control mode after the output torque of the electric machine is reduced by the engine beginning to produce torque;

facilitating slip in the second clutch, thereby at least partially isolating the vehicle drive wheels from engine torque disturbances;

engaging the first clutch, thereby connecting the engine to the electric machine; and fueling the engine, thereby facilitating torque production by the engine.

14. The method of claim 13, further comprising fully engaging the second clutch after the engine is fueled, thereby eliminating slip in the second clutch and facilitating torque transfer from the engine and the electric machine to the vehicle drive wheels.

15. The method of claim 13, the vehicle including a transmission having the second clutch disposed therein, the second clutch including a first portion operatively connected to an input shaft of the transmission and a second portion operatively connected to a torque element in the transmission, wherein the second clutch slips at a slip speed defined as a difference between the angular speed of the first and second portions, and wherein engaging the first clutch begins when the slip speed is greater than a first predetermined slip speed.

16. The method of claim 13, the vehicle including a transmission operatively disposed between the electric machine and the vehicle drive wheels, the method further comprising:

keeping the second clutch fully disengaged if the second clutch is fully disengaged when the engine start is requested, and wherein operating the electric machine includes increasing the speed of the electric machine, and engaging the first clutch begins when the speed of the electric machine is greater than a first predetermined electric machine speed.

17. The method of claim 13, the vehicle further having a transmission and an accelerator, the method further comprising keeping the second clutch partially engaged when it is determined that a current transmission gear is below a first gear and a current position of the accelerator is partially open when the engine start is requested, the second clutch being kept partially engaged at least until after the engine is fueled.

18. The method of claim 13, the vehicle further having a transmission and an accelerator, the method further comprising keeping the second clutch partially engaged when it is determined that a current transmission gear is below a first gear and a current position of the accelerator is closed when the engine start is requested, the second clutch being kept partially engaged at least until after the engine is fueled.

* * * * *